US007909396B2

(12) United States Patent
Vitito

(10) Patent No.: US 7,909,396 B2
(45) Date of Patent: Mar. 22, 2011

(54) AUTOMOBILE ENTERTAINMENT SYSTEM

(75) Inventor: Christopher J. Vitito, Lakeland, FL (US)

(73) Assignee: Audiovox Corporation, Hauppauge, NY (US)

( * ) Notice: Subject to any disclaimer, the term of this patent is extended or adjusted under 35 U.S.C. 154(b) by 0 days.

(21) Appl. No.: 10/920,425

(22) Filed: Aug. 18, 2004

(65) Prior Publication Data

US 2005/0166238 A1  Jul. 28, 2005

Related U.S. Application Data

(60) Provisional application No. 60/534,705, filed on Jan. 8, 2004.

(51) Int. Cl.
*A47C 7/62* (2006.01)

(52) U.S. Cl. .................................................. 297/217.3

(58) Field of Classification Search ............. 439/23–26, 439/924.1; 297/217.3, 217.4, 217.6, 188.04, 297/188.05, 188.06, 188.2; 725/75, 77; 348/837; 296/37.16
See application file for complete search history.

(56) References Cited

U.S. PATENT DOCUMENTS

| 4,490,842 | A | 12/1984 | Watanabe |
| 4,835,604 | A | 5/1989 | Kondo et al. |
| RE33,423 | E | 11/1990 | Lobanoff |
| 5,267,775 | A | 12/1993 | Nguyen |
| 5,480,203 | A | 1/1996 | Favalora et al. |
| 5,507,556 | A | 4/1996 | Dixon |
| 5,529,265 | A | 6/1996 | Sakurai |
| 5,713,633 | A | 2/1998 | Lu |
| 5,842,715 | A | 12/1998 | Jones |
| 6,058,288 | A | 5/2000 | Reed et al. |
| 6,217,118 | B1 | 4/2001 | Heilig |
| 6,250,967 | B1 * | 6/2001 | Chu .............................. 439/668 |
| 6,305,962 | B1 | 10/2001 | Maher et al. |
| 6,339,455 | B1 * | 1/2002 | Allan et al. .................... 348/837 |
| 6,361,113 | B2 | 3/2002 | Heilig |
| 6,522,368 | B1 | 2/2003 | Tuccinardi et al. |
| 6,669,260 | B2 | 12/2003 | Clark et al. |
| 6,669,285 | B1 * | 12/2003 | Park et al. .................. 297/217.3 |
| 6,698,832 | B2 | 3/2004 | Boudinot |
| 6,699,080 | B1 * | 3/2004 | Costa ............................ 439/876 |
| 6,871,356 | B2 * | 3/2005 | Chang ............................. 725/75 |
| 6,889,870 | B2 * | 5/2005 | De Laforcade .................. 222/1 |
| 6,899,365 | B2 | 5/2005 | Lavelle et al. |
| 7,040,698 | B2 * | 5/2006 | Park et al. .................. 297/217.3 |
| 2001/0005083 | A1 | 6/2001 | Serizawa et al. |
| 2003/0025367 | A1 | 2/2003 | Boudinot |

(Continued)

FOREIGN PATENT DOCUMENTS

DE  29518369  2/1996

(Continued)

*Primary Examiner* — Jared J Fureman
*Assistant Examiner* — Dru M Parries
(74) *Attorney, Agent, or Firm* — F. Chau & Associates, LLC

(57) ABSTRACT

An automobile entertainment system includes a video system mounted within an automobile headrest. The headrest includes a headrest body and a first downwardly extending headrest extension arm having a passage therethrough. The video system includes a multi-wire cable extending therefrom and the multi-wire cable passes through the first extension arm, wherein the multi-wire cable includes a connection assembly at a distal end thereof. The connection assembly is coupled to distal ends of wires making up the multi-wire cable and the distal ends of the wires are staggered facilitating passage of the multi-wire cable through the headrest extension arm.

7 Claims, 4 Drawing Sheets

U.S. PATENT DOCUMENTS

| | | |
|---|---|---|
| 2003/0137584 A1 | 7/2003 | Norvell et al. |
| 2003/0184137 A1 | 10/2003 | Jost |
| 2003/0226148 A1 | 12/2003 | Ferguson et al. |
| 2004/0007906 A1 | 1/2004 | Park et al. |
| 2004/0021350 A1* | 2/2004 | House .................. 297/217.4 |
| 2004/0032543 A1 | 2/2004 | Chang |
| 2004/0086259 A1 | 5/2004 | Schedivy et al. |
| 2004/0113479 A1 | 6/2004 | Jost |
| 2004/0227696 A1 | 11/2004 | Schedivy et al. |

FOREIGN PATENT DOCUMENTS

| | | |
|---|---|---|
| FR | 2801854 | 6/2001 |
| FR | 2817812 | 6/2002 |
| WO | WO 02/073574 | 9/2002 |

* cited by examiner

AUTOMOBILE ENTERTAINMENT SYSTEM

CROSS REFERENCE TO RELATED APPLICATION

This application is based upon U.S. Provisional Patent Application No. 60/534,705, filed Jan. 8, 2004, entitled "AUTOMOBILE ENTERTAINMENT SYSTEM", which is currently pending.

BACKGROUND OF THE INVENTION

1. Field of the Invention

The invention relates to an automobile entertainment system. More particularly, the invention relates to an automobile entertainment system incorporating a video monitor within the headrest of an automobile.

2. Description of the Prior Art

Entertainment systems for automobiles are well known. As such, many advances have been made in the development of entertainment systems that make the otherwise tedious task of driving in an automobile more bearable. In addition to the development of overhead systems pioneered by the present inventor, systems that mount within the headrest of an automobile have also been developed.

These headrest entertainment systems allow multiple individuals to view a variety of different video sources within the same vehicle. However, and as those skilled in the art will certainly appreciate, the time and expense associated with the production and installation of these headrest systems has made their acceptance within the marketplace limited to only those people able to afford the premium cost associated with their use.

As such, an improved headrest entertainment system is needed which may be manufactured and installed in a cost effective manner while also providing the consumer with independent viewing for each passenger and the versatility he or she desires. The present invention provides such an entertainment system.

SUMMARY OF THE INVENTION

It is, therefore, an object of the present invention to provide an automobile entertainment system including a video system mounted within an automobile headrest. The headrest includes a headrest body and a first downwardly extending headrest extension arm having a passage therethrough. The video system includes a multi-wire cable extending therefrom and the multi-wire cable passes through the first extension arm, wherein the multi-wire cable includes a connection assembly at a distal end thereof. The connection assembly is coupled to distal ends of wires making up the multi-wire cable and the distal ends of the wires are staggered facilitating passage of the multi-wire cable through the headrest extension arm.

It is also an object of the present invention to provide an automobile entertainment system wherein the distal ends of the wires are staggered in a low profile arrangement.

It is another object of the present invention to provide an automobile entertainment system wherein the video system includes a monitor and a video source.

It is a further object of the present invention to provide an automobile entertainment system wherein the video source is a DVD player.

It is still another object of the present invention to provide an automobile entertainment system wherein the multi-wire cable includes a power supply wire and an audio wire.

It is yet another object of the present invention to provide an automobile entertainment system wherein the video system includes only a single multi-wire cable.

It is also an object of the present invention to provide an automobile entertainment system including a central control module to which the multi-wire cable is coupled.

It is a further object of the present invention to provide an automobile entertainment system wherein a main automobile power source is coupled to the central control module supplying power to the video system via the multi-wire cable.

It is also another object of the present invention to provide an automobile entertainment system wherein the connection assembly is composed of a plurality of connectors secured to the distal ends of the wires.

It is also an object of the present invention to provide an automobile entertainment system wherein the connectors at the distal ends of the wires are staggered in a low profile arrangement.

It is a further object of the present invention to provide an automobile entertainment system wherein the connectors are snap connectors.

Other objects, advantages and salient features of the invention will become apparent from the following detailed description, which taken in conjunction with the annexed drawings, discloses a preferred, but non-limiting, embodiment of the subject invention.

DESCRIPTION OF THE PREFERRED EMBODIMENTS

Figure 1:
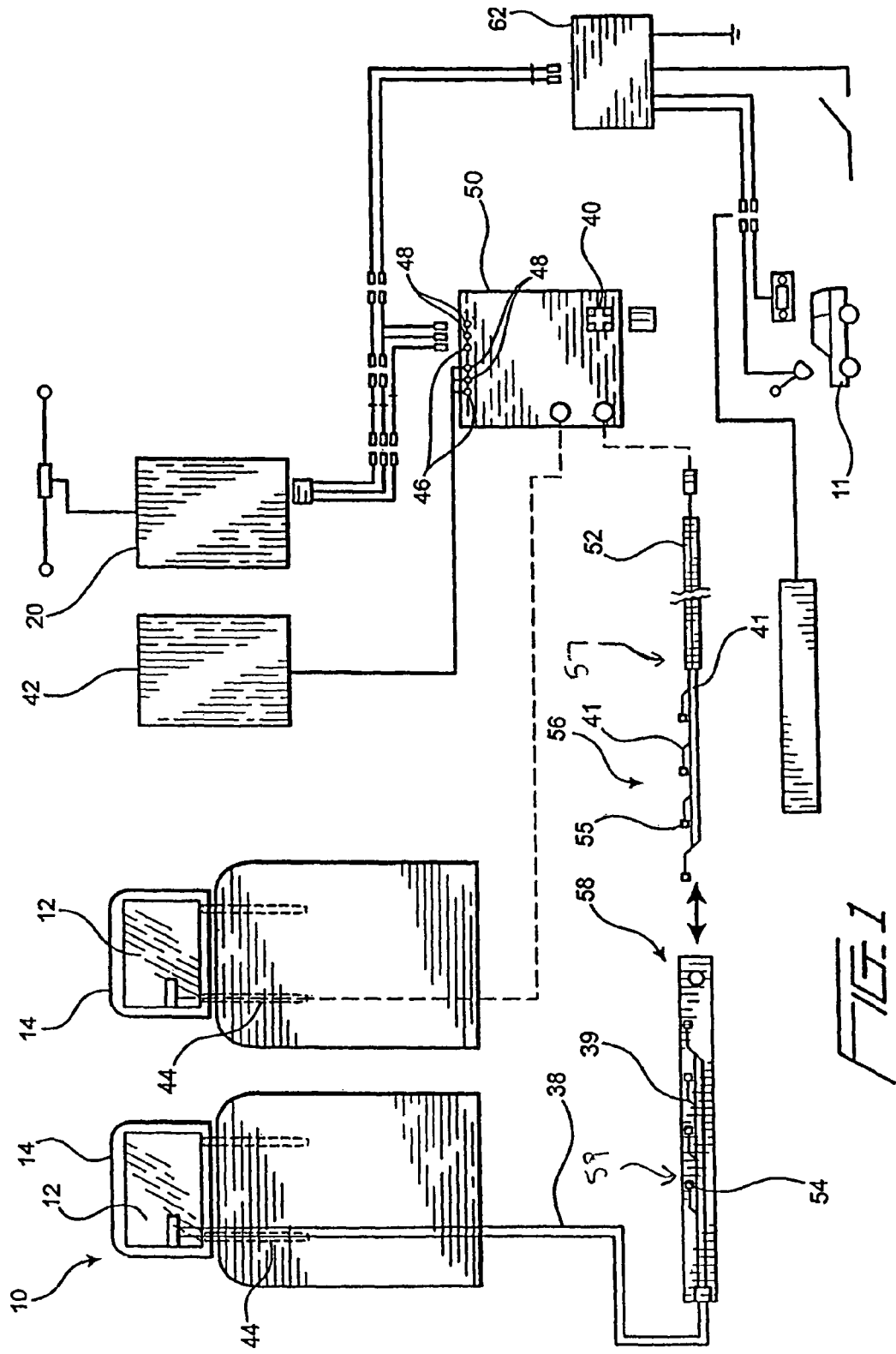
FIG. 1 is a schematic of the present automobile entertainment system.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for teaching one skilled in the art how to make and/or use the invention.

With reference to FIGS. 1, 2, 3 and 4, an automobile entertainment system 10 is disclosed. The automobile entertainment system 10 is composed of a series of video and audio components integrated within an automobile 11. In particular, the entertainment system 10 includes a video system 12 mounted within a standard headrest 14 of an automobile 11 and a video source (for example, DVD player) 20 coupled thereto for the transmission of video content to the video system 12. The video system 12 is composed of a video monitor 16 and an associated support frame 18. The video system 12 is mounted along the rear portion of the headrest 14 such that an individual sitting in the rear seat of the automobile 11 may watch the material presented on the video monitor 16 without disturbing the driver of the automobile 11.

With regard to the DVD player (and optional TV tuner) 20, it is mounted at a remote location within the automobile 11. By mounting the DVD player 20 in this way, various individuals within the automobile 11 may have access to the DVD player 20 and the output of a single DVD player 20 may be transmitted to the various video monitors 16 mounted within the automobile 11.

Figure 2:
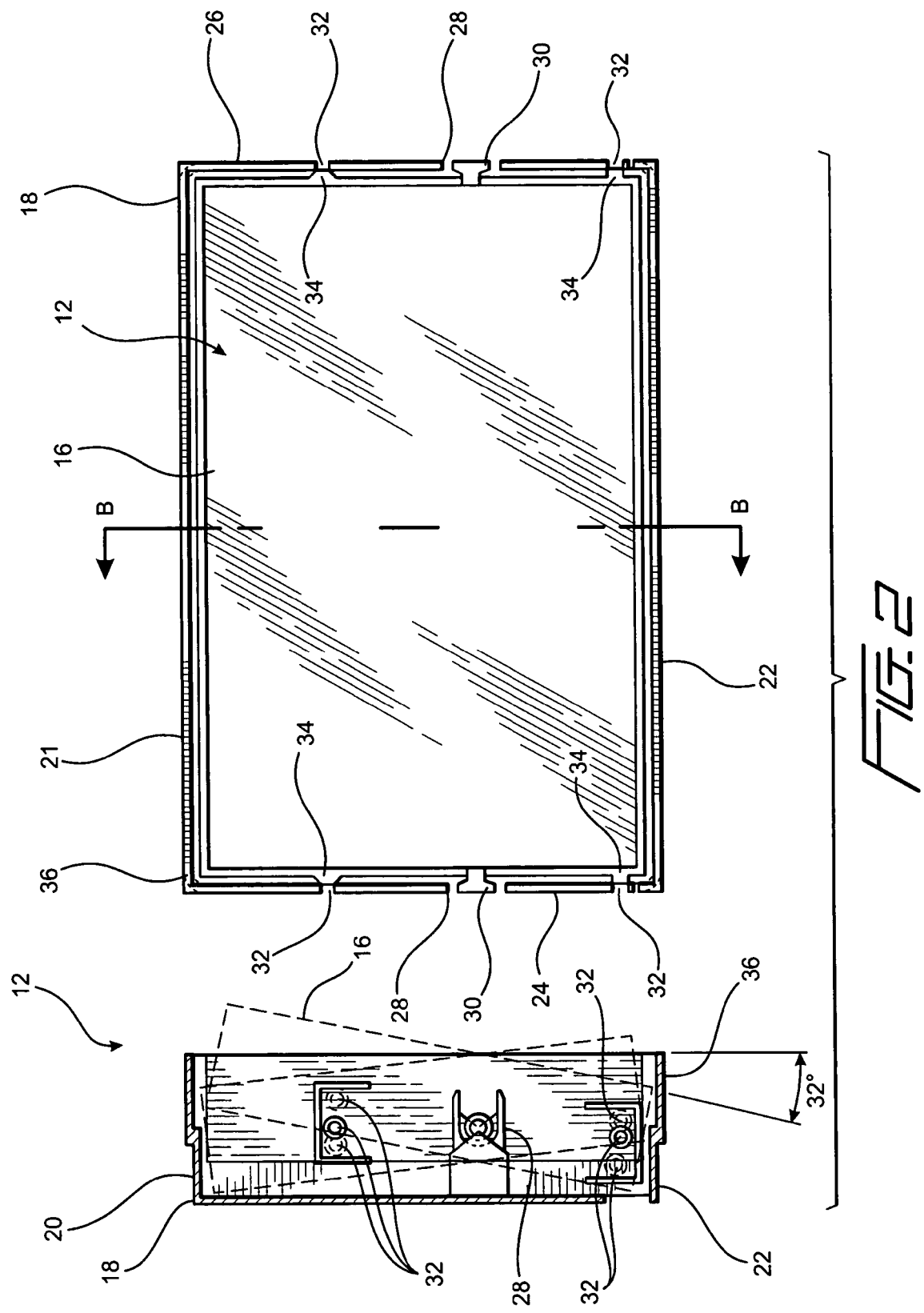
FIG. 2 is a schematic of a video system for use in conjunction of the automobile entertainment system.
Figure 3:
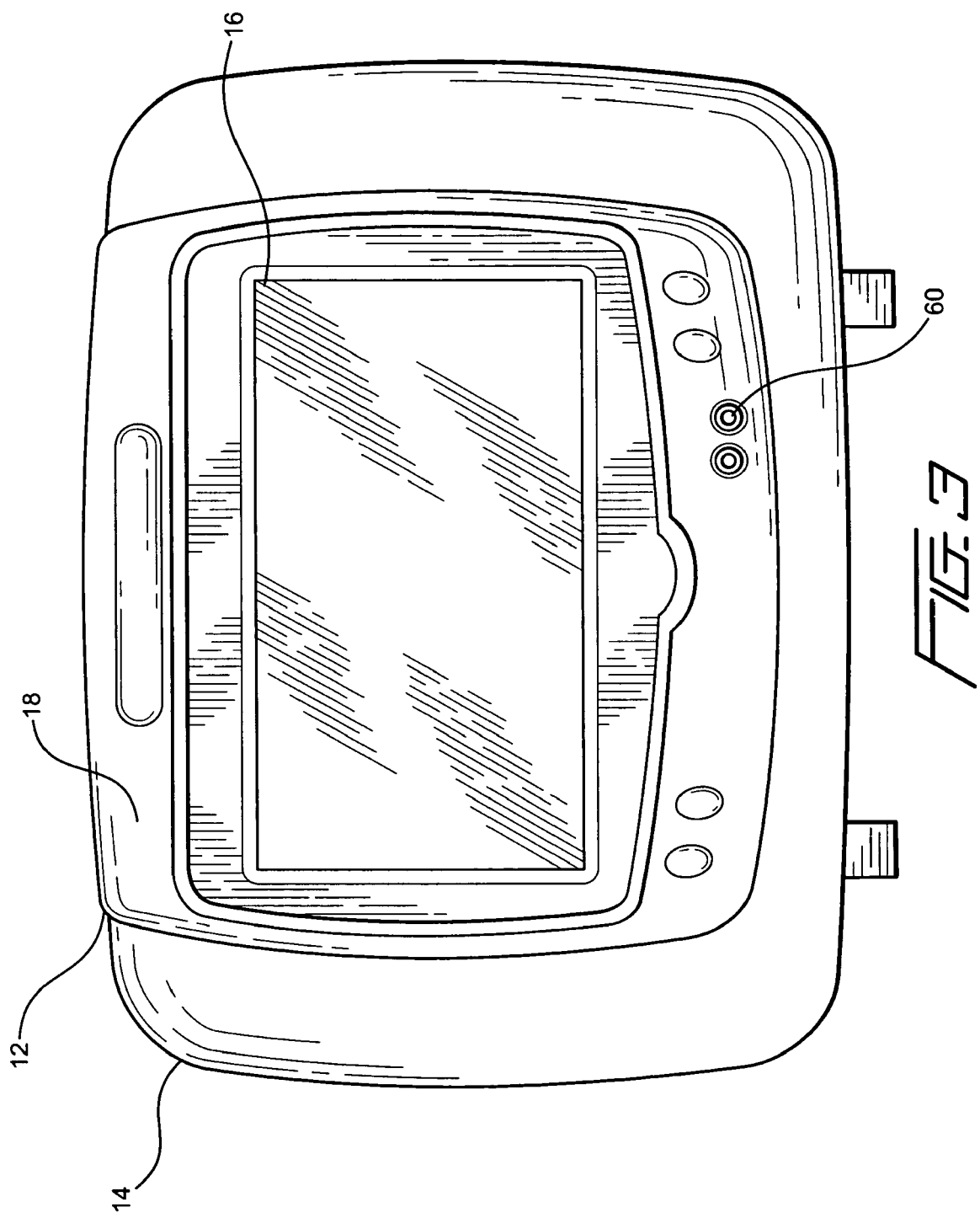
FIG. 3 is a perspective view of the video system.
Figure 4:
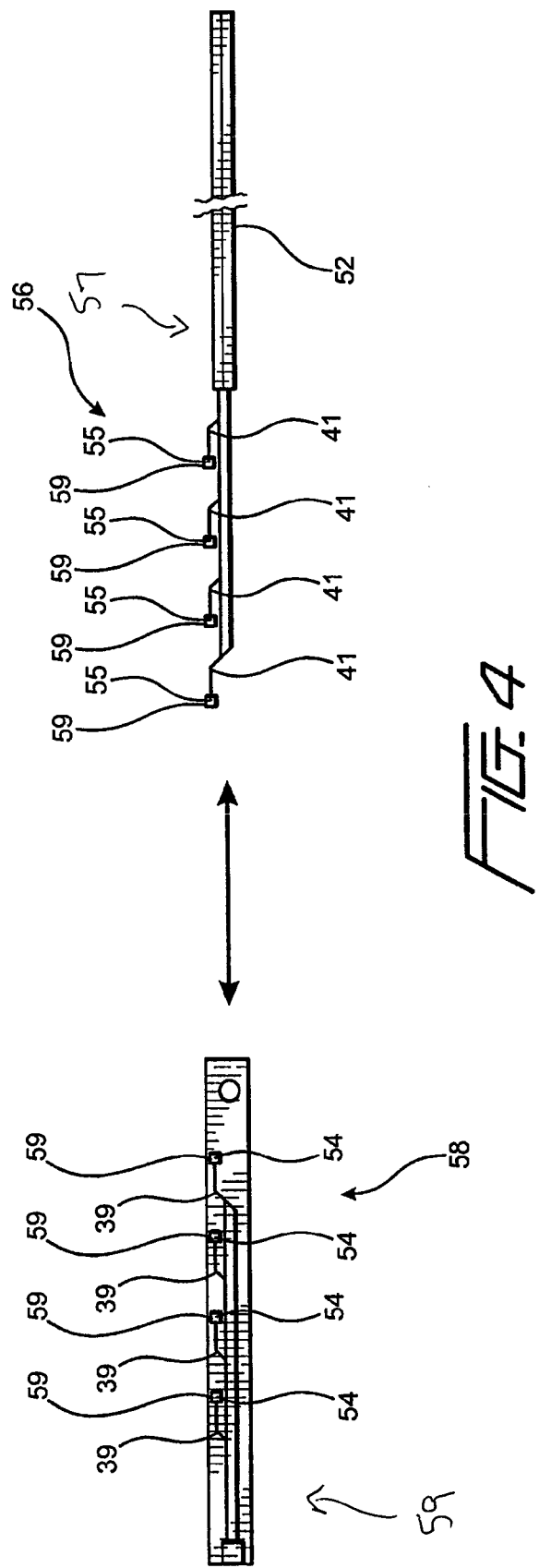
FIG. 4 is a detailed view of the staggered wiring assembly.

With reference to FIG. 2, the housing for the present video system is disclosed. The housing includes a support frame 18 in which the video monitor 16 is pivotally mounted. More specifically, the support frame 18 includes a generally rectangular shell in which the video monitor 16 is mounted. The support frame 18 includes a top wall 21 and a bottom wall 22 connected by a first and second sidewalls 24, 26.

The first and second sidewalls 24, 26 are respectively provided with bearing slots 28 shaped and dimensioned for receiving lateral posts 30 extending from the sides of the video monitor 16. In this way, the lateral posts 30 are mounted within the bearing slots 28 permitting controlled pivoting of the video monitor 16 within the support frame 18.

The controlled movement of the video monitor 16 within the support frame 18 is facilitated by the provision of selectively engageable recesses 32 and detents 34 respectively formed on the support frame 18 and the video monitor 16. The detents 34 are shaped and dimensioned for engagement with the various recesses 32 as the video monitor 16 is pivoted relative to the support frame 18. More specifically, the detents 34 interact with the recesses 32 to control movement of the video monitor 16 by creating predetermined stopping points. As those skilled in the art will certainly appreciate, the support frame 18 includes an outer flange 36 facilitating attachment of the video system 12 to the headrest 14 of an automobile 11.

In accordance with a preferred embodiment of the present invention, the DVD player 20, or other video source, is remotely mounted within the automobile 11. As such, a series of wires, which will be described below in greater detail, are employed in connecting the video monitors 16 to the video source(s).

While the video monitor 16 is disclosed in accordance with a preferred embodiment of the present invention as being separate from the DVD player 20, or other video source, the video monitor may be integrally formed with the DVD player. For example, a video monitor/DVD player slot loaded design may be used without departing from the spirit of the present invention.

As briefly mentioned above, the video system 12 is mounted within the headrest 14 and a multi-wire cable 38 extends therefrom for connection with a power supply 40 and the video source(s) 20, 42. Referring to FIG. 1, the video system 12 is electrically connected to the remainder of the automobile 11 via electrical communication lines extending through the extension arm 44 of the headrest 14. For example, and as will be discussed below in substantial detail, a power source 40, video input 46 and audio input 48 may be respectively connected to the video system 12.

In order to facilitate ease of installation, the multiple wires 39 required for the power source 40 and inputs 46, 48 are maintained within a single cable 38. The multiple wires are passed through a single extension arm 44 of the headrest 14 with the chosen extension arm 44 functioning as a conduit for running a multi-wire cable 38 from the video system 12 to the remainder of the automobile 11.

Ease of installation is achieved by running the video and audio inputs 46, 48 as well as the power supply 40 to a central control module 50. From the central control module 50, the video input 46, audio input 48 and power supply 40 are run to the video monitor 16 via a multi-wire cable 52 shaped and dimensioned for connection with the multi-wire cable 38 running directly from the video monitor 16. As a result, installation of the video monitor 16 is simplified, because it is not necessary to provide for the separate wiring of the various sources required by the present system. It is contemplated the multi-wire cable may include 2 to 10 wires, although those skilled in the art will appreciate that more wires may be incorporated without departing from the spirit of the present invention.

More particularly, the power source 40 runs from the main automobile power source to the central control module 50, while the video and audio outputs 46, 48 coming from the DVD player 20, or other video source 42, are similarly connected to the central control module 50. In accordance with a preferred embodiment, the central control module 50 is designed for input from two video sources 20, 42, and a video game (or other video source) 42 may, therefore, be connected to the central control module 50 for transmission to the video system 12.

Application of dual video sources 20,42 is achieved in accordance with the present invention by utilizing a video monitor 16 capable of switching between two video sources. As such, both video sources 20,42 being transmitted to the central control module 50 are transmitted directly to the video monitor 16 which is then selectively controlled in a conventional manner to display the desired video source on the video monitor 16.

These various sources are coordinated by the central control module 50 and output to the video monitor 16 via a single multi-wire cable 52 with a snap connection assembly 56 at its distal end 57. The video monitor 16 is similarly provided with the multi-wire cable 38 having a snap connection assembly 58 at its distal end 59. The snap connection assembly 58 of the video monitor multi-wire cable 38 is shaped and dimensioned for selective connection with the snap connection assembly 56 of the multi-wire cable 52 running from the central control module 50.

The distal ends 54, 55 of the wires 39, 41 making up the snap connection assemblies 56, 58 each include a snap connector 59. The distal ends 54, 55 of the wires, and therefore, the snap connectors 59, are staggered. Therefore, each of the snap connection assemblies 56, 58 is composed of a series of staggered snap connectors 59 connected to the respective distal ends of the various wires 39, 41.

Staggering the snap connectors 59 coupled to the wires 39, 41 at their distal ends 54, 55 further facilitates passage of the multi-wire cable 38 through the headrest extension arm 44. In particular, and with reference to FIG. 4, the snap connectors 59 at the distal ends 54, 55 of the wires 39, 41 are positioned at different lengths along the snap connection assemblies 56, 58 providing for a lower profile assembly and permitting the passage of additional wires through the headrest extension arms 44.

As those skilled in the art will certainly appreciate, the audio portion of the source may be transmitted to users in a variety of ways without departing from the spirit of the present invention. For example, and in accordance with a preferred embodiment of the present invention, the video monitors 16 are provided with a direct audio input 60 allowing users to simply plug-in their headphones to listen to the audio content of the source being transmitted to the video monitor 16.

In accordance with still a further feature of the present invention, the audio source being generated by the DVD player 20 or other video source 42 is transmitted to a transmitter 62 which transmits the audio content at a frequency received by the radio system of the automobile 11. In this way, the users of the present system need only tune to a predetermined radio frequency to listen to the audio content through the traditional speaker system of the automobile 11. Further, and in accordance with yet a further embodiment of the present invention, the audio output of the DVD player 20 may be hardwired to the radio of the automobile 11 for listening over the stereo system of the automobile 11.

As those skilled in the art will certainly appreciate, it is further contemplated the audio outputs may be connected to a variety of sound transducers which convert the audio signals to audible sounds for listening by those watching the video monitor. For example, the audio output may be connected to the audio system of the automobile 11 for listening through the automobile loudspeakers. Similarly, the audio outputs may be connected to an audio jack shaped and dimensioned for connection with a headphone that is worn while watching the video being played on the video system. As mentioned above, where headphones are utilized the audio outputs will preferably be connected to an IR transmitter for use in conjunction with wireless headphones. Optionally, it is contemplated the audio outputs may be connected to a switch box allowing for selective use of both the audio system of the automobile and/or an audio jack (for attachment with a headphone). As those skilled in the art will certainly appreciate, the system will also include ports for the attachment of video games and other video sources.

Control of the DVD player 20 is facilitated by the provision of control buttons (not shown) along the outer surface of the DVD player. The control buttons are conventional in the art and may take a variety of forms. In addition to the provision of manual control buttons, the DVD player may further include a remote control (not shown) such that an individual need not actually touch the DVD player 20 or video system 12 to control the video content or the volume generated by the video system 12. Once again, and as those skilled in the art will certainly appreciate, a variety of remote control systems may be utilized without departing from the spirit of the present invention.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. An automobile entertainment system, comprising:
a video system including a video monitor mounted within an automobile headrest, the headrest including a headrest body and a first downwardly extending headrest extension arm including a passage therethrough;
a multi-wire cable extending directly from the video monitor, wherein the multi-wire cable includes a low-profile snap connection assembly at a distal end thereof, the connection assembly is coupled to distal ends of wires making up the multi-wire cable and includes snap connectors at the distal ends of respective wires, and the distal ends of the wires are staggered facilitating passage of the entire multi-wire cable, including the low-profile snap connection assembly, from the video system, fully through the headrest extension arm, and to a power source within an automobile;
wherein by staggering the snap connectors connected at the distal ends of respective wires passage of the multi-wire cable fully through the headrest extension arm is facilitated by positioning the snap connectors at different lengths along the snap connection assembly so as to provide a lower profile assembly and permit the passage of additional wires through the headrest extension arms.

2. The entertainment system according to claim 1, wherein the video system includes a monitor and a video source.

3. The entertainment system according to claim 2, wherein the video source is a DVD player.

4. The entertainment system according to claim 1, wherein the multi-wire cable includes a power supply wire and an audio wire.

5. The entertainment system according to claim 1, wherein the video system includes only a single multi-wire cable.

6. The entertainment system according to claim 1, further including a central control module to which the multi-wire cable is coupled.

7. The entertainment system according to claim 6, wherein a main automobile power source is coupled to the central control module supplying power to the video system via the multi-wire cable.

* * * * *